(Model.)
J. B. CLOPTON.
Gin Saw Gummer.
No. 238,352.                    Patented March 1, 1881.
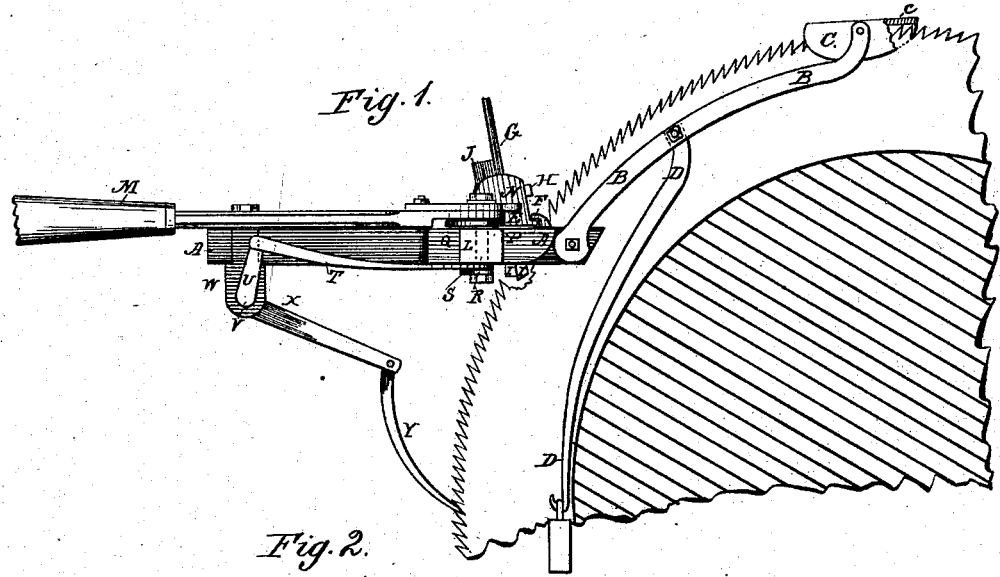
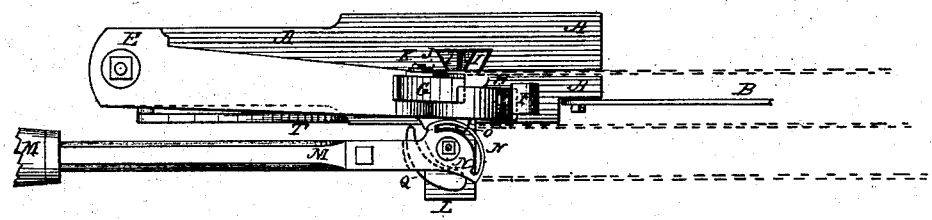
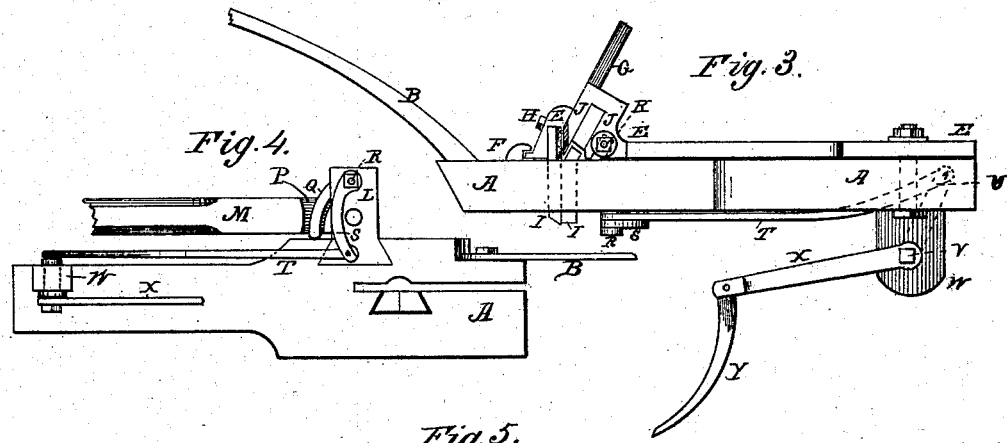
WITNESSES:                                INVENTOR:
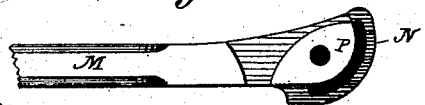    
J. B. Clopton,
BY
ATTORNEYS.

UNITED STATES PATENT OFFICE.

JOHN B. CLOPTON, OF ELGIN, TEXAS.

GIN-SAW GUMMER.

SPECIFICATION forming part of Letters Patent No. 238,352, dated March 1, 1881.

Application filed June 17, 1880. (Model.)

*To all whom it may concern:*

Be it known that I, JOHN B. CLOPTON, of Elgin, in the county of Bastrop and State of Texas, have invented a new and useful Improvement in Gin-Saw Gummers, of which the following is a specification.

Figure 1 is a side elevation of the improvement, illustrating its use. Fig. 2 is a plan view of the improvement, also showing a series of saws in dotted lines. Fig. 3 is a side elevation of the improvement reversed. Fig. 4 is a bottom view, with part of the lever broken away. Fig. 5 is a view, showing the cam on the under side of the lever; and Fig. 6 is a side view of the gage for the forward side of the teeth.

The object of this invention is to furnish gin-saw gummers so constructed as to shear off the surplus metal in a solid piece from either side of the teeth, and thus bring the teeth to a point, making all the teeth of a uniform shape and size.

The invention consists in constructing a gin-saw gummer of a base-block, having a slot to receive the saw, and carrying the dies or stationary cutters, the guide-bar and shoe, the weight-bar, the pivoted bar, carrying the cutter and the gage, the lever and cam for operating the cutter-bar, and the feed mechanism, as will be hereinafter fully described.

Similar letters of reference indicate corresponding parts.

A represents the base of the gummer, in the forward end of which is formed a slot to receive the edge of the saw to be gummed. The forward end of the base A is rabbeted upon one side, and to it is pivoted the end of a bar, B, which passes along the side of the saw to be gummed. The bar B is curved, and its forward end is bent upward, and has a guide-shoe, C, pivoted to it, which shoe is grooved to receive the edge of the saw. The shoe C slides forward upon the edge of the saw, and the shoe C and bar B keep the machine in the plane of the saw, so that all the teeth will be cut true.

To the middle part of the bar B is pivoted the upper end of a bar, D, which passes down between the saws, is curved, and has a hook formed upon its lower end, to receive a cord having a weight attached to it. The weight should rest upon the floor, and should be of sufficient gravity to hold the machine against the action of the feed, so that the feed will turn the saw-cylinder backward, while the gummer always remains in the same position.

To the upper side of the rear end of the base-block A is pivoted the rear end of a bar, E, which bar rests upon the upper side of the base A, and has its forward end rabbeted to fit into a rabbet or groove in a projection, F, formed upon or attached to the upper side of the right-hand forward part of the said base A. The forward end of the bar E is made thicker, and has an inclined groove formed in it to receive the bit or cutter G, which is secured in place by a set-screw, H, passing in through the forward end of the said bar E. The rear side of the cutter G is straight, to cut the forward sides of the teeth, and the forward side of the cutter G is beveled at its lower end, to cut the rear sides of the teeth. The cutting is done by the left-hand edge of the lower end of the cutter G, operating as shears against the dies I, which are made in two pieces, and set in a dovetailed recess in the base-block A, at the left-hand side of its slot.

To the left-hand side of the forward part of the bar E is attached a gage-plate, J, which is made U-shaped, and is let into the side of the said bar. The rear arm of the gage J is slotted to receive the bolt K, that secures it in place, so that it may be removed by loosening the bolt K. This slot also allows the gage-plate J to be moved up and down to regulate the depth of cut required, as the teeth may be more or less dull. The forward arm of the gage J rests against the edge of the cutter G, with which it exactly coincides in width, and is beveled upon the lower end to correspond with the beveled lower end of the said cutter, so that it can be adjusted to allow the said cutter to cut the desired amount from the rear sides of the teeth of the saw.

It is obvious that in order to sharpen the teeth the beveled or cutting end of the cutter G must be extended lower down than the beveled end of the gage J, as shown in Fig. 3, against which latter the saw-teeth rest. By this means the degree of cut is indicated by the adjustment of said gage J, which allows the saw-teeth to more or less overlap the beveled extended edge of the cutter.

The gage J' is made exactly like the gage J, except that the beveled end of the said gage is rabbeted upon its straight edge, as shown in Fig. 6, to allow the cutter G to cut the desired amount from the forward sides of the saw-teeth.

Upon the right-hand side of the forward part of the base A is formed, or to it is attached, an arm, L, to the upper side of which is pivoted the lever M.

Upon the forward end of the lever M is formed, or to it is attached, a cam, N, which rests against the right-hand side of the forward end of the bar E, so that the said bar E may be forced to the left to make a cut by operating the lever M.

In the cam N is formed a curved slot to receive a projection, O, formed upon the bar E, so that the said bar E may be drawn back, after making a cut, by the reverse movement of the lever M.

Upon the under side of the forward end of the lever M is formed, or to it is attached, a cam, P, (shown in Figs. 4 and 5,) which engages with and operates a curved arm, Q. The outer end of the curved arm Q is rigidly attached to the upper end of the bolt R, which passes through and works in a hole in the outer end of the arm L, and to its lower end is rigidly attached the outer end of a curved arm, S.

To the inner end of the curved arm S is pivoted the forward end of a connecting-rod, T, the rear end of which is pivoted to the upper end of an arm, U. The lower end of the arm U is rigidly attached to a bolt or pivot, V, which works in a bearing in a short hanger, W, attached to the under side of the outer or rear end of the base-block A. To the other end of the bolt V is rigidly attached the rear end of an arm, X, to the forward end of which is pivoted the upper end of a pawl, Y. The lower end of the pawl Y engages with the teeth of the saw being sharpened, so as to operate upon the said teeth. The various arms and bars of the feeding mechanism are so arranged as to move the saw each time through the space of one tooth, while the cutter G is not in contact with the saw, the pawl being raised during the latter part of the outward movement of the lever M, and forced downward during the first part of the inward movement of the said lever.

Having thus fully described my invention, I claim as new and desire to secure by Letters Patent—

1. A gin-saw gummer constructed substantially as herein shown and described, consisting of the base-block A, the guide bar and shoe B C, the weight-bar D, the pivoted bar E, carrying the cutter G and gage J, the dies I, the lever and cam M N, for operating the cutter-bar E, and the feed mechanism, as described.

2. In a saw-gummer, the combination, with the base-block A, carrying the dies I I, the pivoted bar E, carrying the cutter G and guide J, and the lever and cam M N, of the cam P, the curved arms Q S, the connecting-bar T, the arms U X, and the pawl Y, substantially as herein shown and described, whereby the saw is moved through the space of one tooth while the cutter is being withdrawn from and moved back to the saw, as set forth.

JOHN BENJ. CLOPTON.

Witnesses:
J. C. BUCHANAN,
A. B. McLAVY.